(No Model.)
B. H. CHAMEROY.
ELASTIC TIRE.
No. 587,544. Patented Aug. 3, 1897.
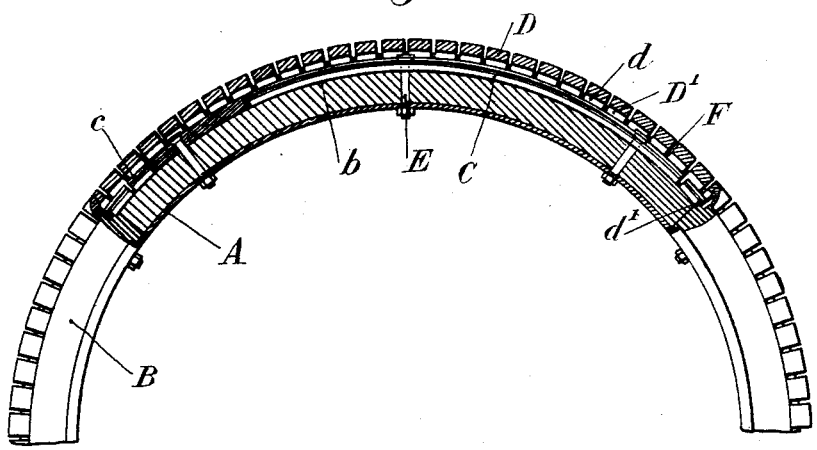
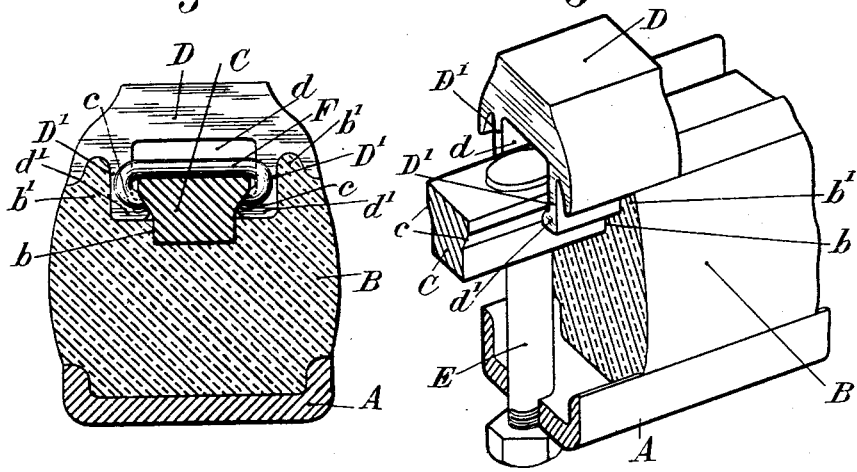
Witnesses:-
Edward Visser.
George Barry Jr.
Inventor:-
Bernard Hippolyte Chameroy
by attorneys
Brown & Seward

UNITED STATES PATENT OFFICE.

BERNARD HIPPOLYTE CHAMEROY, OF LE VESINET, FRANCE.

ELASTIC TIRE.

SPECIFICATION forming part of Letters Patent No. 587,544, dated August 3, 1897.

Application filed June 8, 1897. Serial No. 639,815. (No model.)

*To all whom it may concern:*

Be it known that I, BERNARD HIPPOLYTE CHAMEROY, of Le Vesinet, in the Republic of France, have invented a new and useful Improvement in Elastic Wheel-Tires, of which the following is a specification.

My invention relates to elastic tires which comprise an annular band of india-rubber mounted upon the felly and covered by independent metal segments which constitute the tread or rolling surface and which effectually protect the india-rubber band from the destructive action of hard or sharp bodies or substances without impairing the elasticity of the tire, the said segments pressing only upon the india-rubber band and so yielding easily when pressure is exerted upon them and transmitting directly to the elastic band the pressure which they receive.

My invention consists in a construction of tires of this class by which I insure perfect elasticity and obtain a cheap and simple tire easy to mount and to keep in place.

My new tire is characterized by the fact that the short metal segments which cover the annular india-rubber band are retained upon the latter by their engagement under the lateral edges of a metal hoop of suitable profile lodged in a groove in the band and leaving between it and the heads of the segments an empty space, which permits the latter to yield with the greatest facility under the action of an external pressure and to transmit integrally this pressure to the elastic band. This attaching-hoop, which is preferably itself composed of several segments placed end to end, is retained in place by a certain number of bolts, which pass through it as well as through the india-rubber band and the felly.

In the accompanying drawings, Figure 1 represents a side view, partly in section, of portions of a felly and tire embodying my invention. Fig. 2 represents a transverse section on a larger scale; and Fig. 3, a perspective view of portions of the tire and felly.

A designates the felly, which, in this example, is of metal and has a shallow groove in its outer periphery which receives the annular band B of india-rubber or analogous elastic material. This band presents in its periphery the form shown in Fig. 2. It will be seen that in the middle part there is an annular groove $b$, in which is received the lower part of the metal hoop C. The latter presents a profile of dovetail or analogous form, and under its outwardly-projecting edges $c$ are engaged the inwardly-projecting edges $d'$, with which the jaws $D'$ of the metal segments D, hereinafter termed the "tread-segments," and which constitute the rolling surface of the tire, are furnished. These jaws have a height or depth such that there remains between the crown of the hoop C and the head D of the tread-segments an empty space $d$.

To the right and left of the hoop C the periphery of the band B and the inner surface of the segments have a corresponding form, such that the segments find upon the band a good bearing-surface, as is shown clearly in Fig. 2. This figure shows besides that the jaws $D'$ are engaged in a cavity of the band between the flanges $b'$, which are formed thereon and which prevent the lateral displacement of the segments.

The height or depth of the empty space $d$, provided between the segments D and the hoop C, is such that when the segments yield to the action of external pressure they may do so without touching the surface of the hoop C. In this way the pressure is transmitted integrally to the india-rubber band, and the elasticity of the latter is not diminished by the presence of the metal. In order that the segments D may not clash and bind when they yield to the pressure, I interpose between the adjacent segments transverse flat or round metal wires F, bent at both ends to hook under the hoop C. These wires or metal bands F are thick enough to keep the segments so separated that they can never touch each other.

For facilitating the mounting the hoop C is formed of segments of a certain length fixed in place in the groove of the band B by a suitable number of bolts E, which pass through the hoop C, the band B, and the felly A. The heads of these bolts are countersunk in the hoop C, as shown in Fig. 1, that they may not project considerably within the empty space $d$.

To put the tire in place, the tread-segments D and the separating wires or bands F are threaded upon the segments of the hook C. If the said hook should be of a single piece, the segments D and the wires F are threaded upon the hoop while it is open at one point. Then it is placed upon the band B.

It should be understood that my improved tire may be of any dimensions and applied to metal or other wheels of all diameters and for vehicles of all kinds.

What I claim as my invention is—

1. An elastic tire comprising in combination a felly, an annular band of elastic material mounted upon the felly, a metal hoop placed upon the said band and presenting lateral projections, metallic tread-segments covering the band and bearing thereon on both sides of the said hoop, the said segments presenting inwardly-projecting edges which engage freely with those of the hoop and leaving between their heads and the periphery of the hoop an empty space which permits the segments to yield to external pressures and to transmit integrally these pressures to the elastic band, substantially as herein described.

2. An elastic tire comprising in combination a felly, an annular band of elastic material mounted upon said felly, a metal hoop in segments fixed upon the said band and presenting lateral projections, and metal tread-segments covering the band and bearing thereon on opposite sides of the said hoop, the tread-segments presenting lateral projections which engage freely under those of the hoop and leave between their heads and the surface of the hoop an empty space which permits the tread-segments to yield to external pressures and to transmit integrally those pressures to the elastic band, substantially as herein described.

3. An elastic tire comprising in combination a felly, an annular band of elastic material mounted upon said felly, a metal hoop lodged in the peripherical groove in the said band and retained therein by bolts and presenting lateral projections, and metal tread-segments covering the band and bearing thereon on opposite sides of the said hoop, said segments presenting lateral projections which engage freely under those of the hoop and leaving between their heads and the surface of the hoop an empty space which permits said segments to yield to external pressures and to transmit integrally the said pressures to the elastic band, substantially as herein described.

4. An elastic tire comprising in combination a felly, an annular band of elastic material mounted upon said felly, a metal hoop consisting of segments lodged in a peripherical groove in the said band and retained therein by bolts and presenting lateral projections, and metal tread-segments covering the band and bearing thereon on opposite sides of the said hoop, the tread-segments presenting lateral projections which engage freely under those of the hoop-segments and leaving between their heads and the surface of the hoop an empty space which permits said segments to yield to external pressures and to transmit integrally those pressures to the india-rubber band, substantially as herein described.

5. An elastic tire comprising in combination a felly, an annular band of elastic material mounted upon said felly, a metal hoop fixed upon said band and presenting lateral projections, metal tread-segments covering said band and bearing thereon on opposite sides of the said hoop, the said segments presenting lateral projections which engage freely under those of the hoop and leaving between their heads and the periphery of the hoop an empty space which permits the segments to yield to external pressures and to transmit integrally those pressures to the india-rubber band, and transverse metal bands interposed between the adjacent segments, substantially as herein described.

In witness whereof I have hereunto set my hand in the presence of two subscribing witnesses.

BERNARD HIPPOLYTE CHAMEROY.

Witnesses:
EDWARD P. MACLEAN,
ALCIDE FABE.